(12) United States Patent
Streichsbier et al.

(10) Patent No.: US 8,048,207 B1
(45) Date of Patent: Nov. 1, 2011

(54) METHOD FOR DELIVERING A FLUID TO A DIESEL PARTICULATE FILTER

(75) Inventors: Michael Streichsbier, El Cerrito, CA (US); Juston Smithers, Albany, CA (US); Bradley L. Edgar, Oakland, CA (US)

(73) Assignee: Cleaire Advanced Emission Controls, LLC, San Leandro, CA (US)

( * ) Notice: Subject to any disclaimer, the term of this patent is extended or adjusted under 35 U.S.C. 154(b) by 0 days.

(21) Appl. No.: 13/165,012

(22) Filed: Jun. 21, 2011

Related U.S. Application Data

(62) Division of application No. 12/135,317, filed on Jun. 9, 2008.

(60) Provisional application No. 60/946,793, filed on Jun. 28, 2007.

(51) Int. Cl.
*B01D 46/00* (2006.01)

(52) U.S. Cl. ................ 95/279; 95/280; 95/282; 55/302; 55/303

(58) Field of Classification Search ............ 55/302, 55/303, 523, DIG. 30; 95/278, 279, 280, 95/282; 134/34, 37, 166 C, 167 C, 167 R, 134/172, 198
See application file for complete search history.

(56) References Cited

U.S. PATENT DOCUMENTS

| | | | | |
|---|---|---|---|---|
| 3,167,415 A | * | 1/1965 | Edwards | 55/302 |
| 3,424,501 A | * | 1/1969 | Young | 406/109 |
| 4,046,525 A | * | 9/1977 | Matsuo et al. | 95/147 |
| 4,730,454 A | * | 3/1988 | Pischinger et al. | 60/274 |
| 4,731,100 A | * | 3/1988 | Loeffelmann et al. | 95/281 |
| 4,790,830 A | | 12/1988 | Hamacher | |
| 5,112,368 A | * | 5/1992 | Gosselin | 95/280 |
| 5,361,452 A | * | 11/1994 | Horn | 15/406 |
| 5,421,336 A | | 6/1995 | De Bernardis | |
| 5,679,174 A | * | 10/1997 | Buongiorno | 134/22.18 |
| 5,725,618 A | | 3/1998 | Shimoda et al. | |
| 5,930,994 A | | 8/1999 | Shimato et al. | |
| 6,010,547 A | | 1/2000 | Jeong et al. | |
| 6,233,926 B1 | | 5/2001 | Bailey et al. | |
| 6,367,663 B1 | | 4/2002 | Condon et al. | |
| 6,676,720 B1 | * | 1/2004 | Simonsen | 55/302 |
| 6,760,972 B2 | | 7/2004 | Zifferer | |
| 7,025,811 B2 | * | 4/2006 | Streichsbier et al. | 95/279 |
| 7,357,829 B2 | * | 4/2008 | Ehlers | 95/279 |
| 7,371,266 B2 | * | 5/2008 | Streichsbier et al. | 55/283 |
| 7,462,222 B2 | * | 12/2008 | Sellers et al. | 95/279 |

(Continued)

FOREIGN PATENT DOCUMENTS

EP 1162351 A1 12/2001

(Continued)

OTHER PUBLICATIONS

Clean Air Systems, AeroCLEAN: for Use with Permit Filters, brochure AC005A, Jun. 2008.

Donaldson Company, Inc., Heavy-Duty Diesel Engine DPF Pulse Cleaner, brochure No. F111181, Jan. 2006.

(Continued)

*Primary Examiner* — Robert Clemente

(74) *Attorney, Agent, or Firm* — Brooks Kushman P.C.

(57) ABSTRACT

A conduit may be used to deliver a pressurized fluid to a cell of a diesel particulate filter to clean the cell. The pressurized fluid may remove particulate matter from the cell. The conduit may be moved within the cell to dislodge particulate matter within the cell. The conduit may be manually or automatically inserted into the cell.

24 Claims, 11 Drawing Sheets

U.S. PATENT DOCUMENTS

| | | |
|---|---|---|
| 7,582,141 B2 * | 9/2009 | Ehlers ............................. 95/280 |
| 2002/0084290 A1 | 7/2002 | Materna |
| 2006/0070359 A1 | 4/2006 | Sellers et al. |
| 2006/0201326 A1 | 9/2006 | Wagner et al. |
| 2008/0006155 A1 * | 1/2008 | Sellers et al. ................... 95/282 |

FOREIGN PATENT DOCUMENTS

| | | |
|---|---|---|
| FR | 2794992 A1 | 6/1999 |
| JP | 8158856 A1 | 6/1996 |

OTHER PUBLICATIONS

Donaldson Company, Inc., Diesel Particulate Filter Thermal Regenerator, brochure No. F111182, Feb. 2006.

ECS CombiClean brochure, #M21-0024, Dec. 2002.

Environmental Solutions Worldwide Inc., Model RC-2 Cleaning System, Jun. 2008.

FSX, Inc., http://fsxinc.com/filter.htm, accessed Jun. 20, 2008.

* cited by examiner

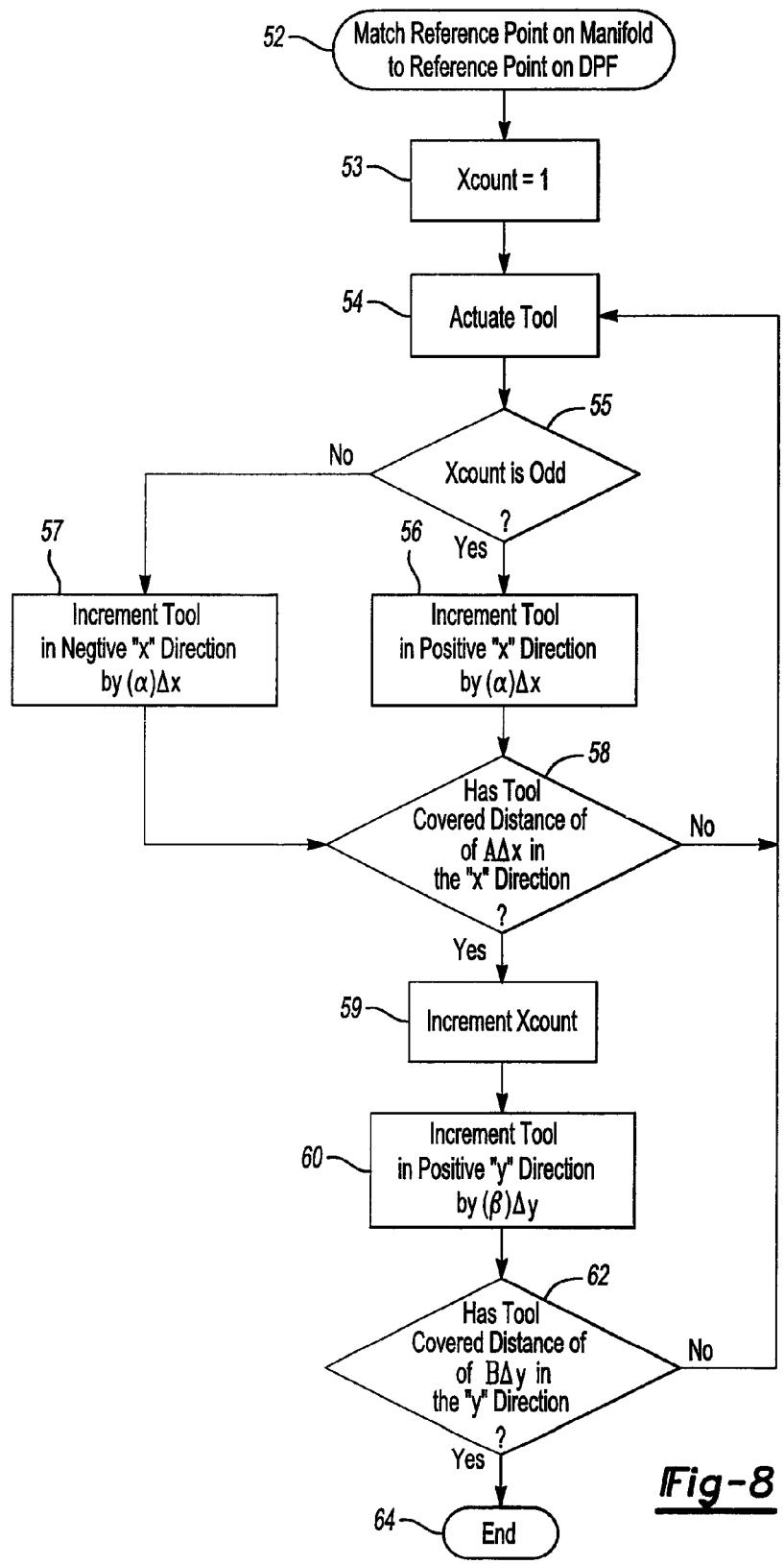

METHOD FOR DELIVERING A FLUID TO A DIESEL PARTICULATE FILTER

CROSS-REFERENCE TO RELATED APPLICATIONS

This application is a divisional of application Ser. No. 12/135,317, filed Jun. 9, 2008, which claims the benefit of U.S. Provisional Application No. 60/946,793, filed Jun. 28, 2007, the contents of each of which are hereby incorporated by reference in their entirety.

TECHNICAL FIELD

This disclosure relates to apparatus and methods for delivering fluids to diesel particulate filters.

BACKGROUND

A diesel particulate filter (DPF) may remove combustible (carbonaceous) and incombustible particulate matter (PM) from an exhaust gas stream of an engine. Combustible particulate is a complex blend of solid carbon and organic compounds, and may result from the incomplete combustion of diesel fuel in a cylinder of the engine. Incombustible particulate is generated from additives in lubrication oil or fuel for the engine, and material eroded from the engine surfaces. Under some circumstances, the combustible PM may fully combust during filter regeneration and thus exit the filter as gaseous $CO_2$ and $H_2O$. In general, the incombustible particulate cannot be converted to gaseous components and may be trapped in the filter as various oxides or other compounds (collectively called "ash").

A DPF may require periodic cleaning to remove ash structures formed in channels of the DPF. A pressurized fluid may be applied to outer surfaces of the DPF to clean it. The ash structures, however, may be strong enough to resist removal by such application of pressurized fluid.

Each channel of the DPF may be probed with a solid rod to dislodge the ash structures from the channels. Such probing, however, may not remove the ash being broken apart and may, instead, pack the ash making it more difficult to remove.

SUMMARY

A method for delivering pressurized fluid from a pressurized fluid source to a cell of a wall-flow particulate filter may include inserting a fluid delivery tube into the cell, delivering the pressurized fluid from the pressurized fluid source to the cell via the fluid delivery tube to dislodge particulate matter within the cell, and removing the fluid delivery tube from the cell.

BRIEF DESCRIPTION OF THE DRAWINGS

FIG. 8 is a flow chart depicting an algorithm for operating a DPF cleaning apparatus according to an embodiment of the invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

One or more conduits may be inserted into a DPF to dislodge and/or remove particles in the DPF by means of mechanical force and/or a pressurized fluid. The conduit(s) may be inserted into the DPF by hand, machine or some combination of both. The conduit(s) may be rigid and made from steel or other suitably rigid materials. The conduit(s) may also be flexible and made from plastic, rubber or other suitably flexible materials. The conduit(s) may have a round, square or any other desired profile.

A manifold may secure one or more conduits in a geometric pattern that matches a pattern of the filter opening to be cleaned. The manifold may also fluidly couple the one or more conduits with a pressurized fluid source. The pressurized fluid may be air, water, or any other suitable fluid, e.g., an acid or other cleaning agent.

An actuation tool may be arranged to automatically position and introduce one or more conduits into open channels of a DPF to clean the DPF. Sensors, e.g., optic, acoustic, etc., may be used to locate open channels of the DPF and ensure that clean channels are not visited more than once by the actuation tool.

A material containment system may capture filtrate, particulate matter, etc. removed from a DPF. For example, a vacuum may be positioned adjacent to/in a vicinity of a substrate face of a DPF to capture the filtrate, particulate matter, etc. dislodged from the DPF. The containment system may protect an operator from exposure to the filtrate, particulate matter, etc. and collect it in a disposable container.

Figure 1:
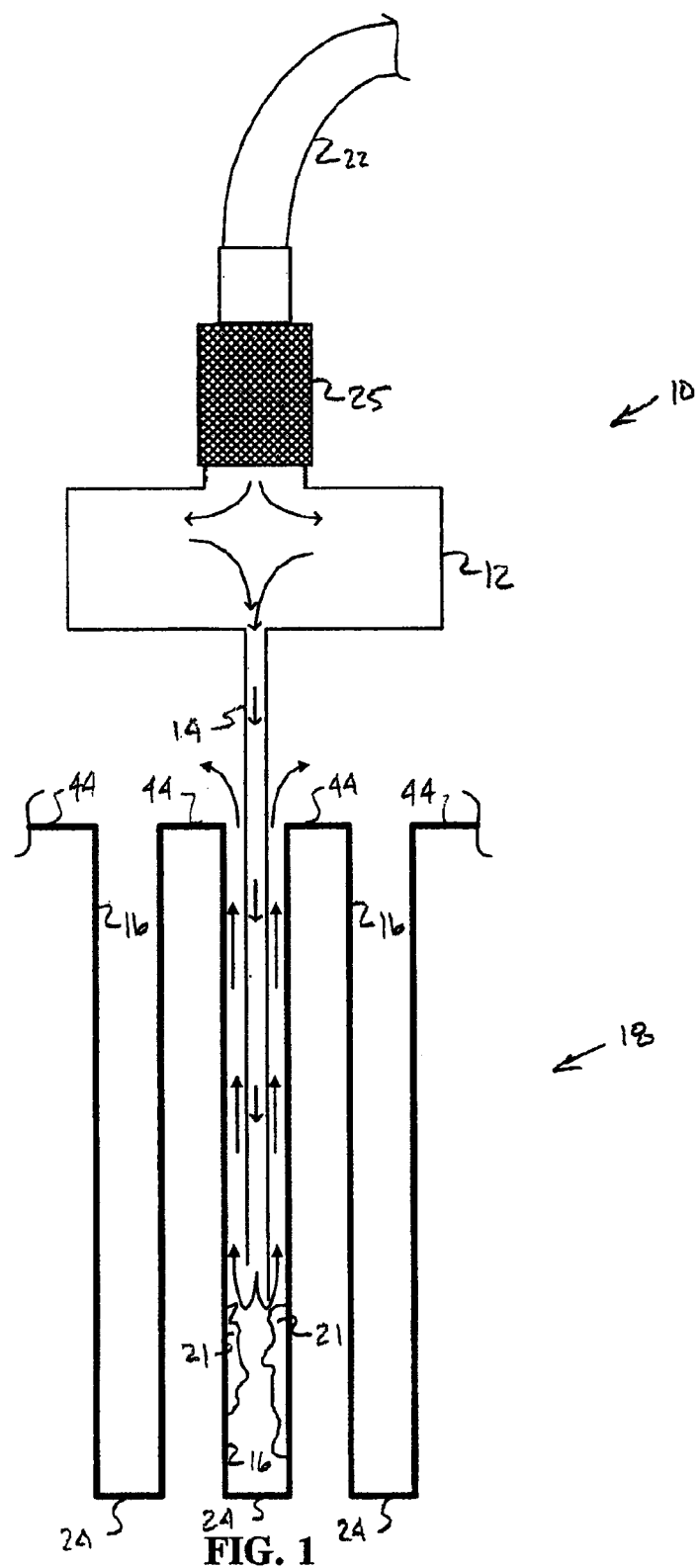
FIG. 1 is a side view, in cross-section, of portions of a Diesel Particulate Filter (DPF) and a DPF cleaning apparatus according to an embodiment of the invention.

Referring now to FIG. 1, a pressurized fluid (as indicated by arrow) of a fluid delivery apparatus 10 flows from a manifold 12, through a conduit 14, e.g., a fluid delivery tube, and into a channel 16 of a wall-flow DPF 18. Of course, the fluid delivery apparatus 10 may be used with any filter having channels. The tube 14 is used to loosen and remove accumulated particulate 21 from the DPF 18.

In the embodiment of FIG. 1, the tube 14 is rigid and is connected to a pressurized fluid supply 22, e.g., an air supply used for tools found in most automotive service shops. Other configurations, however, are also possible. The tube 14 of FIG. 1 delivers air to the channel 16. The tube 14, however, may be used to deliver any type of fluid to the channel 16. For example, the fluid may be water, a liquid surfactant, a liquid solvent or any fluid that will help dislodge and remove the particulate 21 from the channel 16.

The tube 14 has dimensions that permit it to be inserted into the channel 16. The length of the tube 14 is sufficient to reach a sealed end 24 of the channel 16. In other embodiments, however, the tube 14 may have any desired length. Additionally, the tube 14 may have openings in its side wall in addition to, or instead of, its end to deliver cleaning fluid to the channel 16.

In the embodiment of FIG. 1, the manifold 12 is of sufficient size to maintain constant pressure upstream of the tube 14. The manifold 12 may also contain some means, e.g., a collar 25, for attaching it with the pressurized fluid supply 22.

The tube 14 may be inserted into the channel 16 on the inlet side of the DPF 18. As installed on a vehicle, the inlet side of the DPF 18 is the side into which the vehicle exhaust enters and the side where solid particles are captured. The tube 14, however, may also be inserted into a channel on the outlet side of the DPF 18.

By actuating the tube 14, either manually or by some automated or semi-automated mechanism, the solid particles 21 in the channel 16 are dislodged. During actuation, the fluid moves dislodged particulate 21 past the space between the tube 14 and the walls of the channel 16 and out of the DPF 18.

Tube actuation may include steady movement into the channel 16, small back-and-forth motion in the channel 16 or some combination of both. Alternatively, a constant force driven displacement may be used. Other movements are, of course, also possible.

Figure 2:
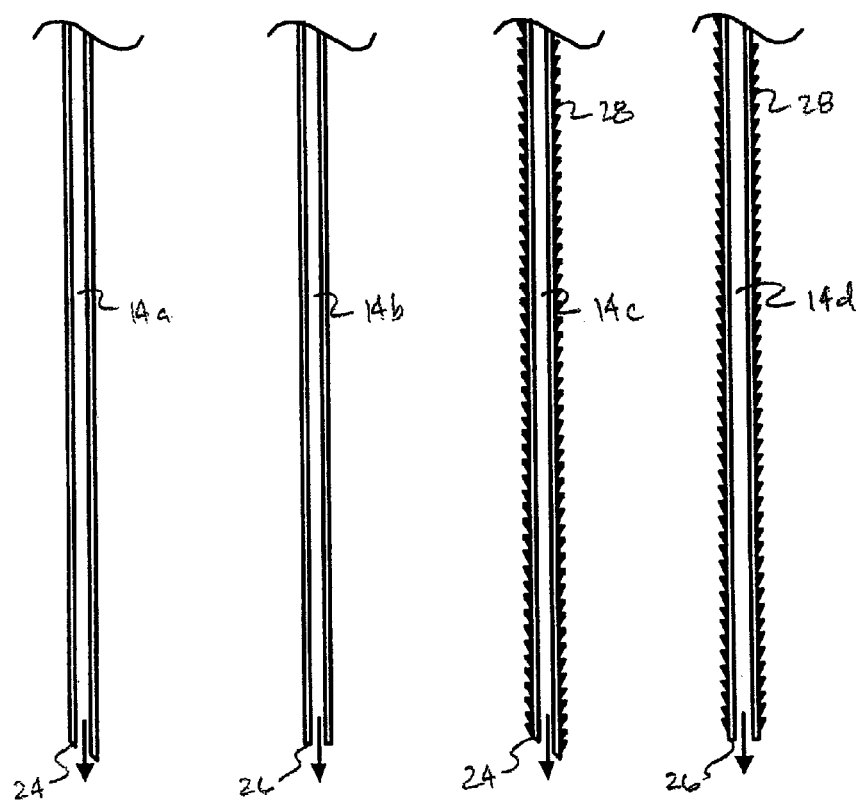
FIG. 2 is a side view, in cross-section, of fluid delivery tubes according to several embodiments of the invention.

Referring now to FIG. 2, tubes 14a-14d include features that may increase their effectiveness at dislodging the particulate matter 21 illustrated in FIG. 1. The tubes 14a and 14c are beveled to sharp points 24. The tubes 14b and 14d are flattened to blunt points 26. The tubes 14c and 14d have knurled surfaces 28. The knurled surfaces 28 may be oriented in such a way that the particulate matter 21 is pulled out of the DPF 18 illustrated in FIG. 1 when removing the tubes 14c or 14d from the DPF 18. Other configurations are, of course, also possible.

Figure 3:
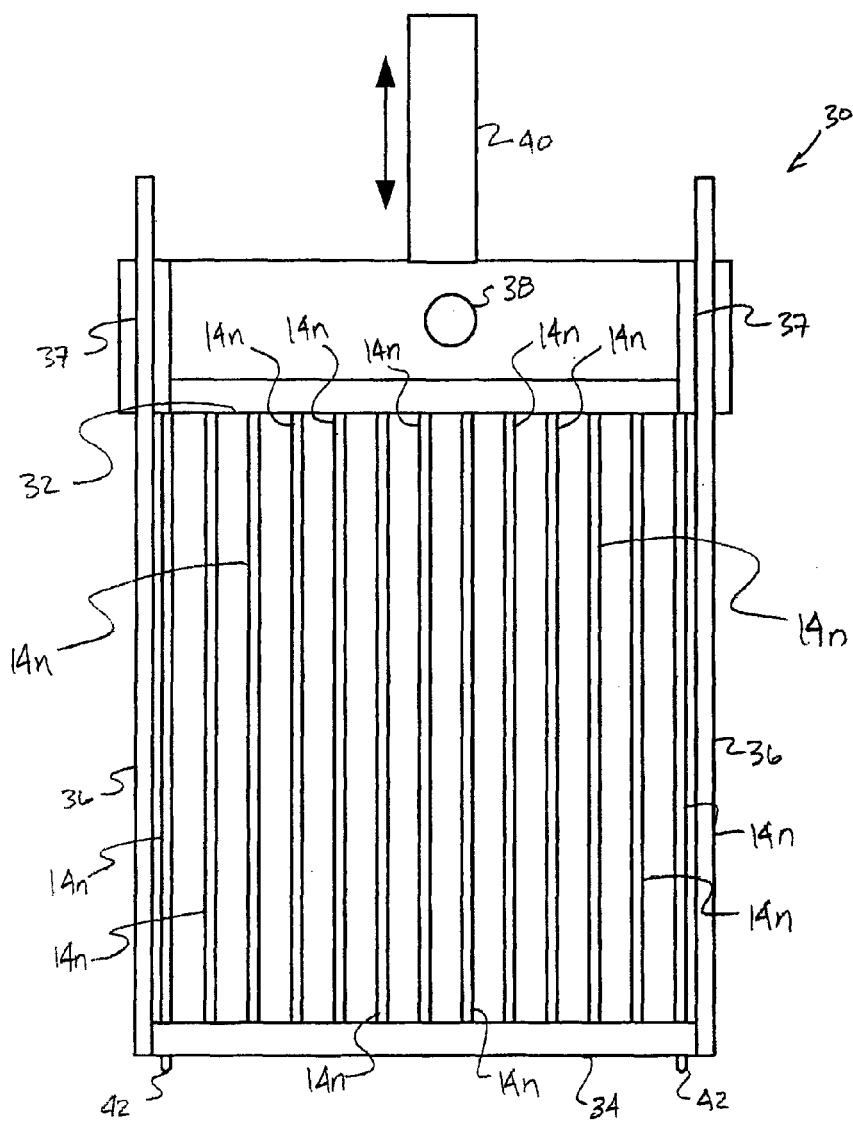
FIG. 3 is a side view of another DPF cleaning apparatus according to an embodiment of the invention.

Referring now to FIGS. 1 and 3, one or more tubes 14n of a DPF cleaning tool 30 are mounted to a manifold 32 in a manner similar to that described with reference to the manifold 12. The manifold 32 is attached to a guide plate 34 through support posts 36. The posts 36 are mounted to the manifold 32 by means of, for example, a bushing or linear bearing 37 to allow free movement between the posts 36 and manifold 32. It is thus possible to actuate the tool 30 in open channels 16 of the DPF 18.

A pressurized fluid is supplied to the manifold 32 through a port 38. An actuator attachment 40 allows either manual handling of the tool 30 or attachment to some automated or semi-automated mechanical device. Index pins 42, which align with open channels 16 in the entrance of the DPF 18, may be used to aid in the alignment of the tool 30 with open channels 16 of the DPF 18.

The tubes 14n may be mounted to the manifold 32 in a variety of ways to facilitate attachment and removal. For example, the tubes 14n may be glued into the manifold 32 or secured by means of a set screw, O-ring, or pressure fitting. Methods to allow easy replacement may be necessary if a tube is damaged or requires replacement.

Alternatively, the entire manifold 32 may be attached to the tool 30 in such a way that the manifold 32 can be quickly and easily removed from the tool 30 and replaced with a new manifold. This method may also be used to replace the tubes 14n with a set having a different geometry to accommodate DPFs having different geometries. The guide plate 34 may also be designed to allow quick and easy removal and replacement.

The guide plate 34 of FIG. 3 contains a series of holes with a geometry matching the DPF 18. The tubes 14n are fed through the holes in the guide plate 34. The guide plate 34 thus positions the tubes 14n in the appropriate geometry for the DPF 18 such that the tubes 14n align with the channels 16 of the DPF 18.

Figure 4:
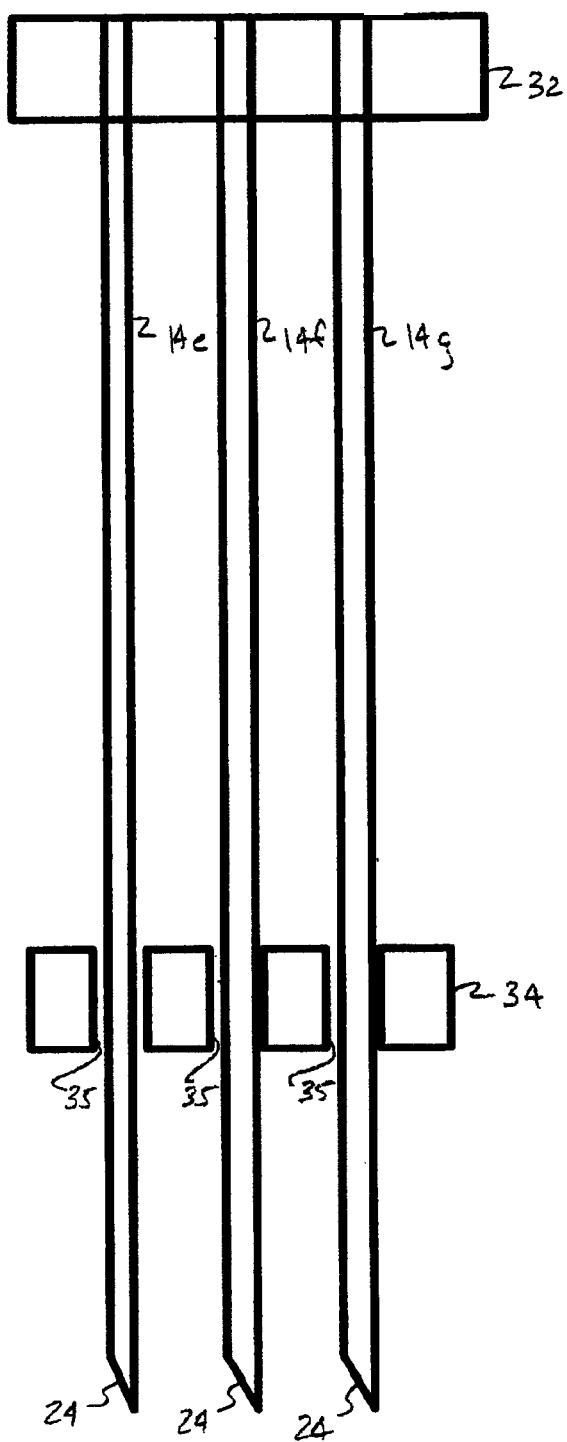
FIG. 4 is an enlarged view of a portion of the DPF cleaning apparatus of FIG. 3.

Referring now to FIG. 4, the tubes 14e-14g are fed into the guide plate 34. In the embodiment of FIG. 4, the diameter of holes 35 in the guide plate 34 is large enough to allow the free movement of the tubes 14e-14g. The guide plate 34 also provides support for the tubes 14e-14g during actuation to prevent buckling. In other embodiments, additional guide plates 34 may be incorporated at various points along the length of the tubes 14e-14g to provide additional support.

Figure 5:
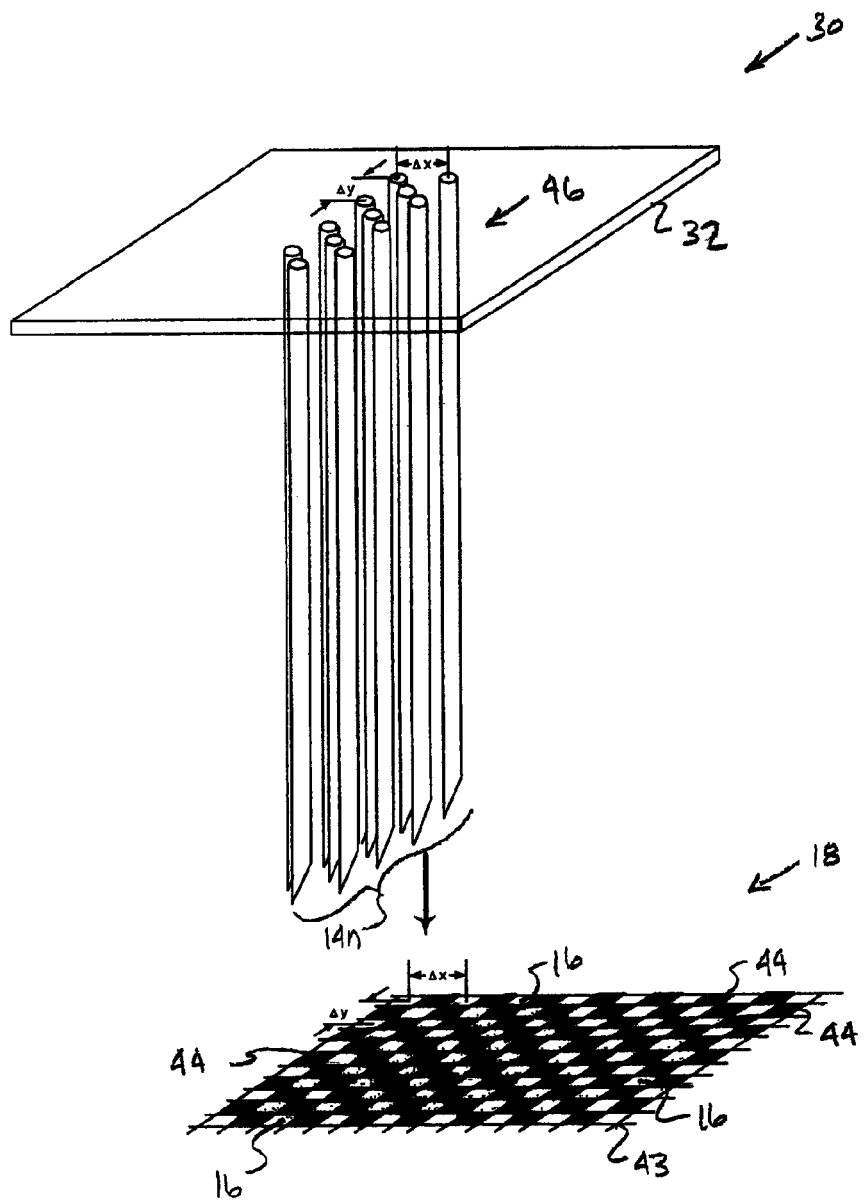
FIG. 5 is a schematic perspective view of a portion of the DPF of FIG. 1 and the DPF cleaning apparatus of FIG. 3.

Referring now to FIG. 5, a Cartesian grid of channels 43 is indicative of channel openings 16 and channel plugs 44. In the embodiment of FIG. 5, the spacing is generally uniform in the "x" and "y" directions: the distance between any two adjacent open channels 16 is a constant $\Delta x$ or $\Delta y$ respectively.

The tubes 14n are mounted into the base plate 32 in a geometric arrangement 46 matching the open channel spacing in the DPF 18. Other arrangements are, of course, also possible. For example, the number of tubes 14n in the "x" and "y" directions may vary given practical constraints, such as ease of tool use or force required to dislodge the particulate matter 21.

The geometric arrangement 46 of the fluid delivery tubes 14n may conform to the filter geometry 43 of the open channels 16. To accommodate different DPF geometries, a variety of base plates 32 may be used. In addition, different base plates may be used to match different geometries within a single DPF. A DPF with both pie-shaped and round segments may require, for example, various base plates with both pie-shaped and round configurations.

Figure 6A:
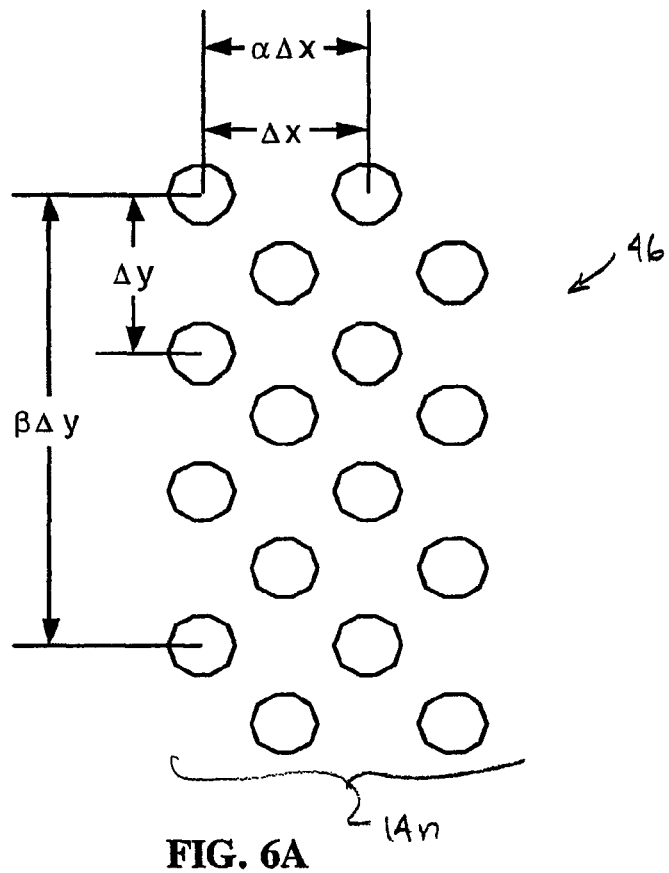
FIG. 6A is a schematic plan view of a portion of the DPF cleaning apparatus of FIG. 3.
Figure 6B:
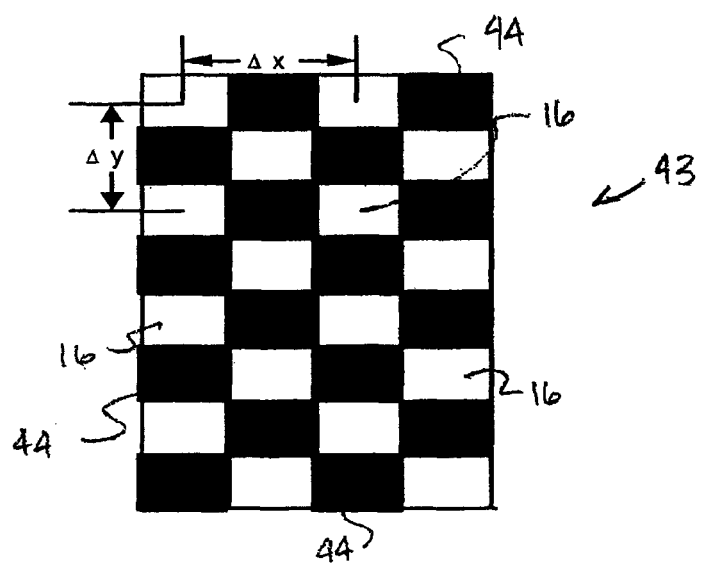
FIG. 6B is a schematic plan view of a portion of the DPF of FIG. 1.

Referring now to FIGS. 6A and 6B, the spacing in the "x" and "y" directions is the same for the geometric arrangement 46 and the filter geometry 43 to allow the tubes 14n illustrated in FIG. 5 to pass into the channel openings 16.

Figure 7:
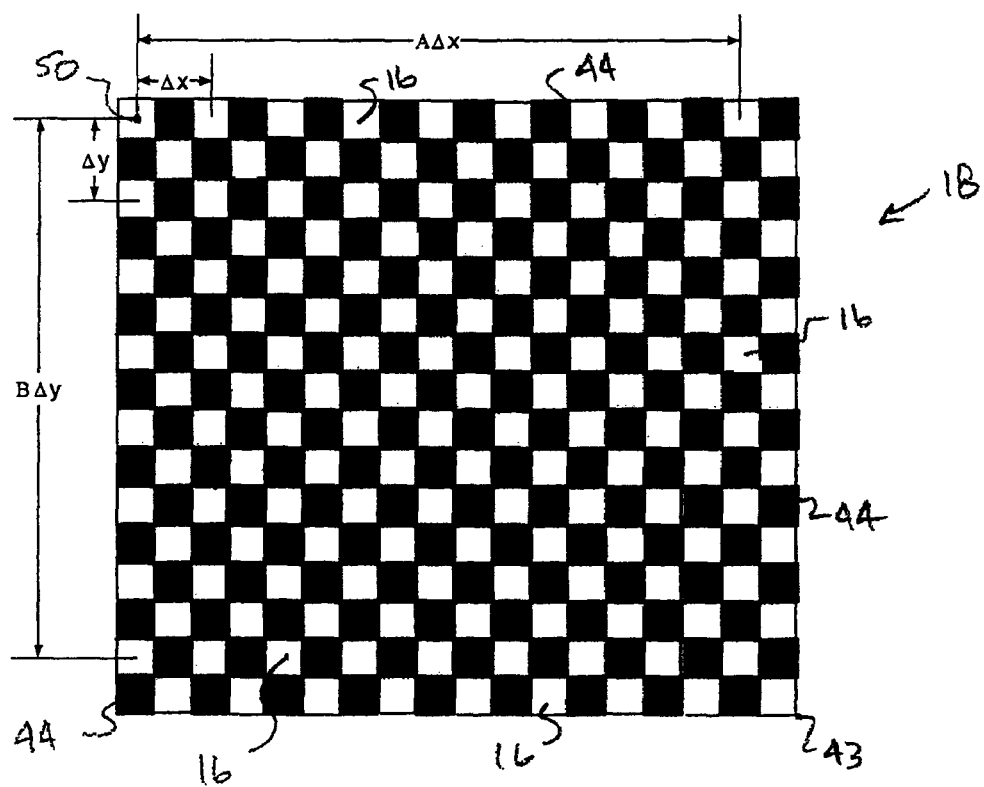
FIG. 7 is another schematic plan view of a portion of the DPF of FIG. 1.

Referring now to FIGS. 1 and 7, a reference point 50 may be used to align the tube 14 with the DPF 18. Once aligned, the apparatus 10 is actuated and then incremented in the "x" direction by a length of $\Delta x$, where $\Delta x$ is the distance between adjacent tubes in the "x" direction. The apparatus 10 may continue to be incremented in the "x" direction until every channel in that coordinate was visited for a particular value of "y." The full distance traveled by the apparatus 10 in the "x" direction would be $A\Delta x$.

The apparatus 10 may then be incremented in the positive "y" direction by an increment of $\Delta y$, where $\Delta y$ is the distance between adjacent channels in the "y" direction. The above process may be repeated in the "x" direction, and then another increment of $\Delta y$ may be completed in the "y" direction. The full process is complete when the apparatus 10 has covered the full length of the DPF 18 in the "y" direction, $B\Delta y$.

The choice of coordinate systems here is arbitrary. One could also start in the "y" direction. Other coordinate systems, such as the polar system, are also valid as long as the spacing of the DPF 18 is uniform in the angular and radial directions.

Referring now to FIG. 8, a reference point on a manifold, e.g., a location associated with a tube, of a DPF cleaning tool is matched with a reference point on a DPF as indicated at 52. As indicated at 53, a counter is set to 1. As indicated at 54, the cleaning tool is actuated. As indicated at 55, it is determined whether the counter is odd. If yes, the cleaning tool is incremented in the positive "x" direction by a predetermined amount as indicated at 56. If no, the cleaning tool is incremented in the negative "x" direction by a predetermined amount as indicated at 57. As indicated at 58, it is determined whether the cleaning tool has covered the entire length of the DPF in the "x" direction. If no, the process returns to 54. If yes, the counter is incremented as indicated at 59. As indicated at 60, the tool is incremented in the positive "y" direction by a predetermined amount. As indicated at 62, it is determined whether the tool has covered the entire length of the DPF in the "y" direction. If no, the process returns to 54. If yes, the process ends as indicated at 64.

Incrementing of the cleaning tool may be performed either by an operator or automatically by, for example, a stepper motor, which may include inputs for the quantities Δx, Δy, A, and B.

Referring again to FIG. 3, actuation of the tool 30 may be performed in a manner similar to that described with reference to FIGS. 7 and 8.

To prevent buckling of the tubes 14n, an automated machine may provide constant force to the actuation coupling 40, where this force is less than the force required to buckle the tubes 14n. The tool 30 may also be actuated using constant velocity in the actuation direction or a combination of constant velocity and small amplitude, high frequency motion superimposed in the actuation direction.

In other embodiments, the apparatus 10 illustrated in FIG. 1 or the tool 30 illustrated in FIG. 3 may be outfitted with a suitable sensor, e.g., an optic sensor (such as a laser) or an acoustic sensor, to detect open channels in a DPF of arbitrary geometry. Once detected, cleaning could be performed automatically using techniques similar to those described above.

For embodiments where an automated or semi-automated machine controls the movement and actuation of the apparatus 10 illustrated in FIG. 1 or tool 30 illustrated in FIG. 3, a computer program may be used to execute such machine controlled movement and actuation. This program may allow input of the cleaning parameters or it may accept an input file that contains these parameters. The file may also contain a graphical representation of a DPF geometry that the machine may use as a guide for actuation and movement. Alternatively, digital imaging techniques may be used to determine the open channel geometry of the DPF to be cleaned.

In still other embodiments, the apparatus 10 illustrated in FIG. 1 or tool 30 illustrated in FIG. 3 remains stationary in the plane of the filter face and a DPF to be cleaned is moved incrementally. The movement of the DPF may follow the same logic as described above.

Figure 9A:
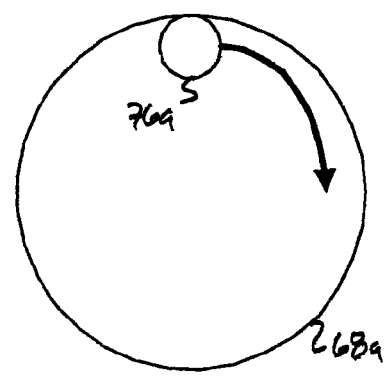
FIGS. 9A-9C are plan views of pressure plates according to an embodiment of the invention.
Figure 9B:
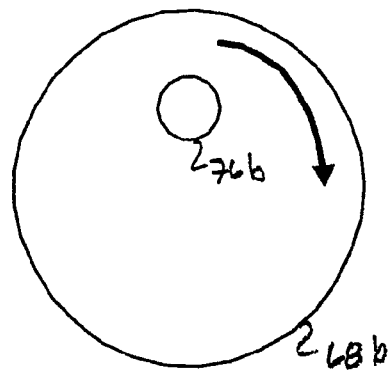
Figure 9C:
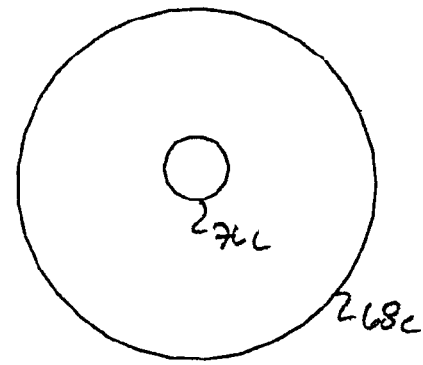

Referring now to FIGS. 9A through 9C, pressure plates 68a through 68c, as discussed below, may be used to determine specific sections within a DPF that may be filled with a certain amount of particulate matter.

Figure 10:
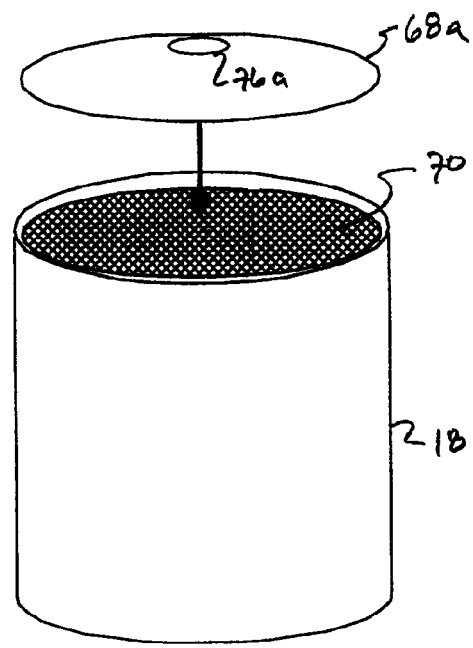
FIG. 10 is an exploded assembly view of the pressure plate of FIG. 9A and the DPF of FIG. 1.
Figure 11:
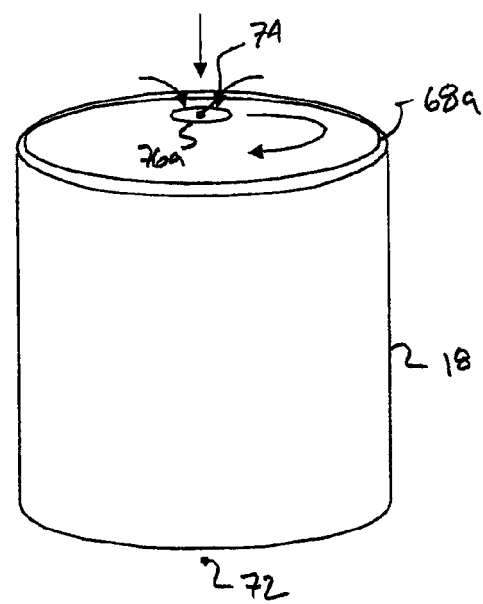
FIG. 11 is an assembly view of the pressure plate of FIG. 9A and the DPF of FIG. 1.

Referring now to FIGS. 10 and 11, a pressure plate 68a is lowered onto a substrate face 70 of the DPF 18. A vacuum is applied to a point 72 downstream of the DPF 18 while a point 74 at the substrate face 70 of the DPF 18 is open to the atmosphere. As such, air is allowed to flow through a port 76a of the pressure plate 68a, through the DPF 18 and out of the DPF 18 at the point 72.

While the pressure plate 68a is rotated on the surface of the DPF 18, the differential pressure between the points 72, 74 is measured. High differential pressure between the points 72, 74 would indicate higher ash loading in that section of the DPF 18.

Referring again to FIGS. 9B and 9C, to obtain full coverage of the DPF face 70 illustrated in FIG. 10, the pressure plates 68b and 68c may be used as described above and the differential pressure measured at ports 76b, 76c respectively.

Figure 12:
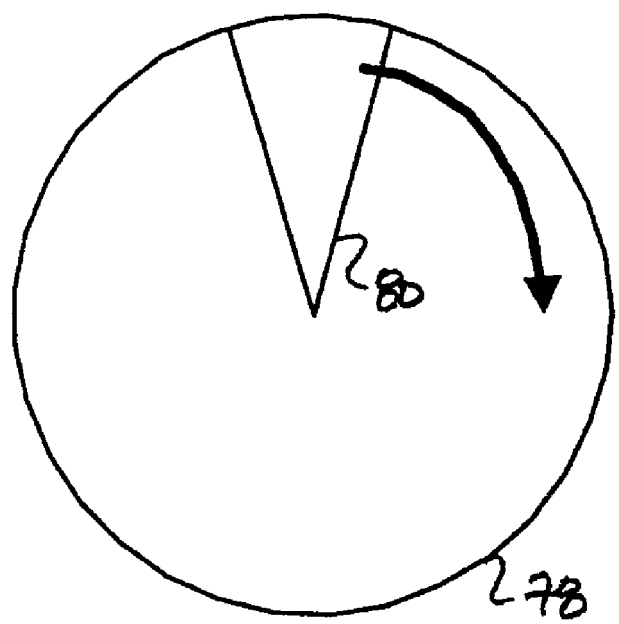
FIG. 12 is a plan view of another pressure plate according to an embodiment of the invention.

Referring to FIG. 12, a pressure plate 78 has a pie-shaped opening 80 through which air may flow as described above. Any suitable pressure plate opening geometry, however, may be used depending on which proves most effective.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for delivering pressurized fluid from a pressurized fluid source to a cell of a wall-flow particulate filter, the method comprising:
   inserting a fluid delivery tube into the cell;
   delivering the pressurized fluid from the pressurized fluid source to the cell via the fluid delivery tube to dislodge particulate matter within the cell; and
   removing the fluid delivery tube from the cell.

2. The method of claim 1 further comprising moving the fluid delivery tube to dislodge the particulate matter within the cell.

3. The method of claim 1 further comprising moving the wall-flow particulate filter to dislodge the particulate matter within the cell.

4. The method of claim 1 wherein the pressurized fluid comprises a liquid.

5. The method of claim 1 wherein the pressurized fluid comprises a gas.

6. The method of claim 1 further comprising installing a pressure plate on an end of the wall-flow particulate filter, applying a vacuum to another end of the wall-flow particulate filter and measuring a pressure drop across the wall-flow particulate filter.

7. The method of claim 1 further comprising capturing at least a portion of the dislodged particulate matter.

8. The method of claim 1 wherein at least one of (i) inserting a fluid delivery tube into the cell, (ii) delivering the pressurized fluid from the pressurized fluid source to the cell via the fluid delivery tube to dislodge particulate matter within the cell and (iii) removing the fluid delivery tube from the cell is performed automatically.

9. A method for delivering pressurized fluid from a pressurized fluid source to a cell of a wall-flow particulate filter, the method comprising:
   inserting a fluid delivery tube at least half-way into the cell of the wall-flow particulate filter, the cell having a maximum width not greater than 3 millimeters;
   delivering the pressurized fluid from the pressurized fluid source to the cell via the fluid delivery tube to dislodge particulate matter within the cell; and
   removing the fluid delivery tube from the cell.

10. The method of claim 9 further comprising moving the fluid delivery tube to dislodge or pulverize the particulate matter within the cell.

11. The method of claim 10 wherein moving the fluid delivery tube to dislodge or pulverize the particulate matter within the cell includes actuating the fluid delivery tube with an amplitude and frequency such that the fluid delivery tube vibrates.

12. The method of claim 9 wherein the fluid delivery tube is inserted into a side of the wall-flow particulate filter where particulate matter has collected.

13. The method of claim 9 further comprising moving the wall-flow particulate filter to dislodge the particulate matter within the cell.

14. The method of claim 9 further comprising installing a pressure plate on an end of the wall-flow particulate filter, applying a vacuum to another end of the wall-flow particulate filter and measuring a pressure drop across the wall-flow particulate filter.

15. The method of claim 9 further comprising capturing at least a portion of the dislodged particulate matter.

16. The method of claim 9 wherein at least one of (i) inserting a fluid delivery tube into the cell, (ii) delivering the pressurized fluid from the pressurized fluid source to the cell via the fluid delivery tube to dislodge particulate matter within the cell and (iii) removing the fluid delivery tube from the cell is performed automatically.

17. A method for delivering pressurized fluid from a pressurized fluid source to a cell of a wall-flow particulate filter, the method comprising:
    inserting a fluid delivery tube having a maximum width less than 3 millimeters and a length approximately equal to at least one-half the length of one of the cells into the cell;
    delivering the pressurized fluid from the pressurized fluid source to the cell via the fluid delivery tube to dislodge particulate matter within the cell; and
    removing the fluid delivery tube from the cell.

18. The method of claim 17 further comprising moving the fluid delivery tube to dislodge the particulate matter within the cell.

19. The method of claim 18 wherein moving the fluid delivery tube to dislodge or pulverize the particulate matter within the cell includes actuating the fluid delivery tube with an amplitude and frequency such that the fluid delivery tube vibrates.

20. The method of claim 17 wherein the fluid delivery tube is inserted into a side of the wall-flow particulate filter where particulate matter has collected.

21. The method of claim 17 further comprising moving the wall-flow particulate filter to dislodge the particulate matter within the cell.

22. The method of claim 17 further comprising installing a pressure plate on an end of the wall-flow particulate filter, applying a vacuum to another end of the wall-flow particulate filter and measuring a pressure drop across the wall-flow particulate filter.

23. The method of claim 17 further comprising capturing at least a portion of the dislodged particulate matter.

24. The method of claim 17 wherein at least one of (i) inserting a fluid delivery tube into the cell, (ii) delivering the pressurized fluid from the pressurized fluid source to the cell via the fluid delivery tube to dislodge particulate matter within the cell and (iii) removing the fluid delivery tube from the cell is performed automatically.

\* \* \* \* \*